US006245230B1

(12) United States Patent
Ricci

(10) Patent No.: US 6,245,230 B1
(45) Date of Patent: Jun. 12, 2001

(54) IMMERSIBLE PORTABLE DECHLORINATOR

(76) Inventor: George Ricci, 931 Metro Dr., Monterey Park, CA (US) 91754

( * ) Notice: Subject to any disclaimer, the term of this patent is extended or adjusted under 35 U.S.C. 154(b) by 0 days.

(21) Appl. No.: 09/363,118

(22) Filed: Jul. 28, 1999

(51) Int. Cl.$^7$ .................................................. C02F 5/08
(52) U.S. Cl. ..................... 210/232; 210/282; 137/268; 222/190
(58) Field of Search .................................... 210/232, 282, 210/501, 503, 198.1, 291; 222/190; 4/538; 137/268

(56) References Cited

U.S. PATENT DOCUMENTS

| | | |
|---|---|---|
| 2,077,298 | 4/1937 | Zelger . |
| 3,633,538 | 1/1972 | Hoeflin .................................. 118/76 |
| 3,924,807 * | 12/1975 | Morgan .................................. 239/55 |
| 4,787,973 * | 11/1988 | Ando et al. ........................... 210/282 |
| 4,853,131 * | 8/1989 | Etani .................................... 210/764 |
| 5,008,011 * | 4/1991 | Underwood ........................... 210/232 |
| 5,527,457 * | 6/1996 | Holland ................................. 210/282 |
| 5,595,652 * | 1/1997 | Rainer .................................. 210/282 |
| 5,980,752 * | 11/1999 | Bowers ................................. 210/282 |
| 6,096,197 * | 8/2000 | Hughes ................................. 210/282 |

FOREIGN PATENT DOCUMENTS

406211643 * 8/1994 (JP) .

* cited by examiner

Primary Examiner—David A. Simmons
Assistant Examiner—Frank M. Lawrence
(74) Attorney, Agent, or Firm—LaValle D. Ptak

(57) ABSTRACT

A portable dechlorinator filter, primarily designed for use in dechlorinating the water in a bath tub or the like, is in the form of a hollow ball made of plastic material. The plastic ball includes a number of perforations or apertures through it to permit the free flow of water from the exterior of the ball through its interior. Filter material made of a copper-zinc compound or brass-zinc compound is provided in the form of elongated filaments (manufactured on the order of steel wool and the like). The filter material is encased in a water-permeable, gauze-like cover placed inside the plastic ball. The gauze-like cover prevents broken ends of the filaments from protruding through any of the holes in the ball. The ball is made of two releasably interconnected hemispheres; so that spent filter material can be removed and replaced with new filter material.

11 Claims, 2 Drawing Sheets

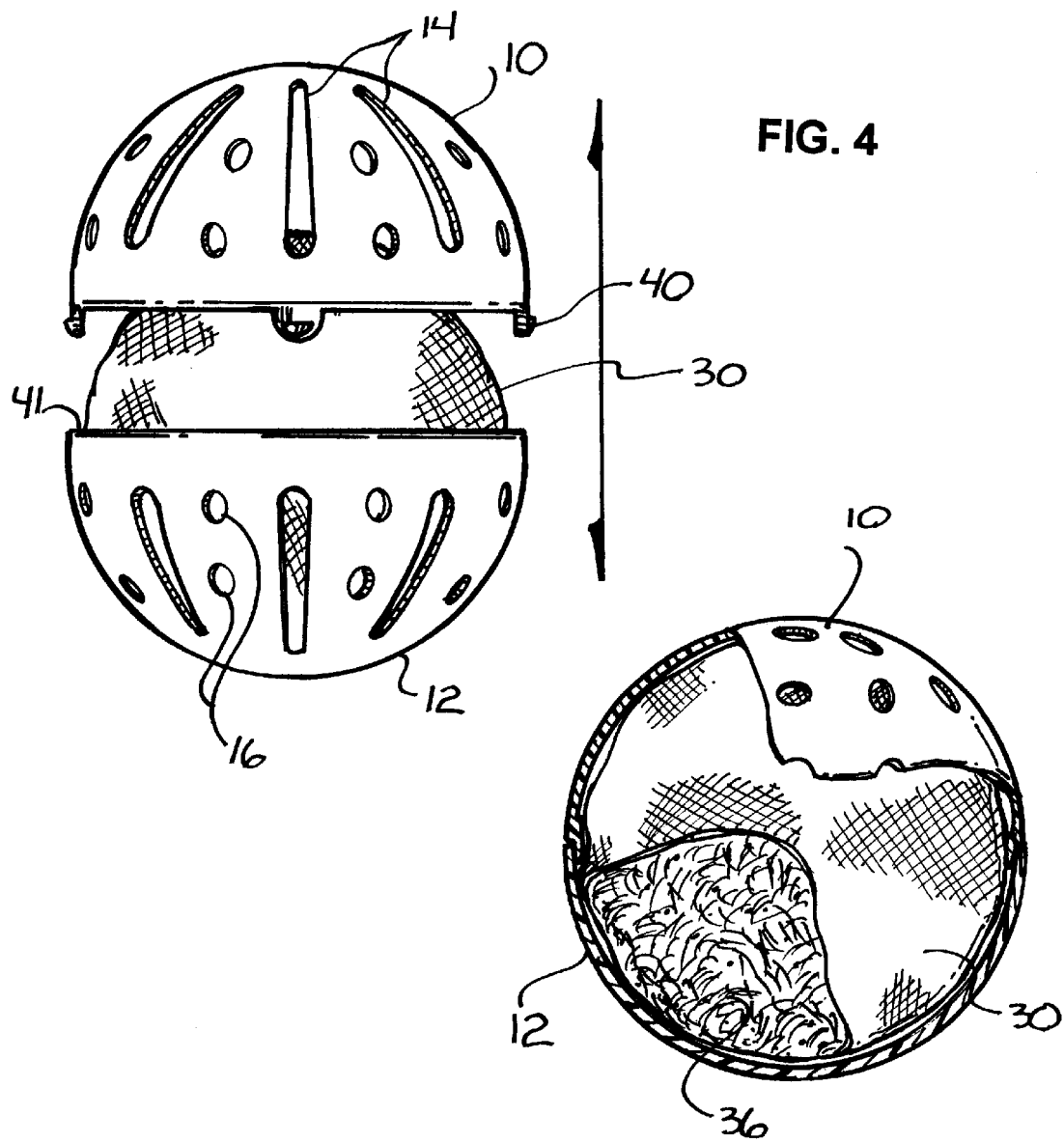

IMMERSIBLE PORTABLE DECHLORINATOR

BACKGROUND

The quality of water supplies in all areas of the United States and in other countries of the world is a major cause of concern. All sources of water, including ground water supplies, are becoming increasingly polluted. A variety of techniques are employed to purify such water so that it can be used for drinking, cooking and bathing purposes.

A purification chemical which is widely used in the United States is chlorine. As water supplies become increasingly polluted, increasing amounts of chlorine are added to those water supplies to purify the water. Chlorine and its derivatives are used by water companies because of the significant effectiveness of chlorine in killing microorganisms. It is well known that chlorine attacks organic matter, making chlorine a potent bleaching agent. In fact, common household bleaches frequently are chlorine based.

Although chlorine is very effective in purifying water, it also is a very hazardous chemical. Even diluted chlorine must be used with care. As increasing amounts of chlorine are used in drinking water, the taste and odor of such drinking water are significantly adversely affected. As a result, many drinking water filter units currently are marketed for removing chlorine and other contaminants from the water at the point of delivery through the taps of homes and businesses. Such filters generally are relatively bulky in size; but usually they are located beneath the sink in a storage cabinet so that they are out of sight.

In most businesses and homes, chlorine usually is not removed from the primary water supply used throughout the home. This results in water delivered to the laundry room and to the bathroom containing relatively large amounts of chlorine. As a result, the water which is delivered to the bath tub, faucets and showers typically contains chlorine where it is inhaled and absorbed by the skin. As mentioned above, chlorine attacks organic matter. Thus, chlorine applied to the skin and hair chemically bonds with the protein present. Chlorine tends to make hair brittle and dry; and it tends to make sensitive skin dry, flaky and itchy.

To overcome this undesirable effect of chlorine in showers, shower dechlorinator filters, typically using granulated copper-zinc alloys, have been designed for attachment to the shower outlet between that outlet and the shower head. These filters are relatively small in size, typically five or six inches in length and two to four inches in diameter. They effectively and relatively unobtrusively function to dechlorinate shower water at the point of delivery. A patent which discloses such a shower filter is the United States patent to Underwood U.S. Pat. No. 5,008,011. This patent discloses a shower dechlorinator fabricated in the form of a short cylindrical housing. The housing is filled with granulated or randomly oriented fibrous material in the form of a copper-zinc metal alloy. Such alloys have been found to be highly effective in removing chlorine from water coming into contact with the alloy.

While filters of the type disclosed in the Underwood patent have been found to be effective in removing chlorine from water delivered to a shower, nothing comparable to these filters exists for a bath tub. A primary reason for the difficulty in providing a chlorine removal filter for a bath tub is that the water delivery spouts for bath tubs are not standardized. These spouts come in a large number of different configurations. For any filter to be placed in-line in a bath tub water delivery system, the filter must be installed in the water line in the wall or in the tub, behind the spout. As a result, the replacement of expended filter elements becomes difficult if not impossible. On the other hand, to adapt a filter to fit on the end of the wide variety of bath tub spouts which exist has not proved practical.

It is desirable to provide a chlorine removal filter for use in a bath tub which is simple in construction, which has a replaceable filter element, which is easy to use, and which is effective in eliminating chlorine from bath water.

SUMMARY OF THE INVENTION

It is an object of this invention to provide an improved filter for removing chlorine from a body of water.

It is another object of this invention to provide an improved bath tub dechlorinator.

It is an additional object of this invention to provide an improved small portable dechlorinator filter unit usable for dechlorinating bath water.

It is a further object of this invention to provide an improved small dechlorinator filter unit placed into a body water, such as in a bath tub, for removing chlorine from the water as the filter is moved back and forth in the water.

In accordance with a preferred embodiment of this invention, a portable dechlorinator for a confined body of water comprises a hollow (preferably spherical) body member which has a plurality of openings through it. A chlorine removal filter material (preferably in the form of a copper-zinc alloy) is placed in the hollow body member; and a water permeable cover member is located inside the body member between the filter material and the inner surface of the body member to prevent the filter material from entering into or passing out of the openings of the body member.

BRIEF DESCRIPTION OF THE DRAWINGS

FIG. 4 is another embodiment showing another alternative feature of a preferred embodiment of the invention; and FIG. 5 is a partially cut away view of the embodiment of any one of FIGS. 1 through 4 illustrating details of construction of the preferred embodiment of the invention.

DETAILED DESCRIPTION

Figure 1:
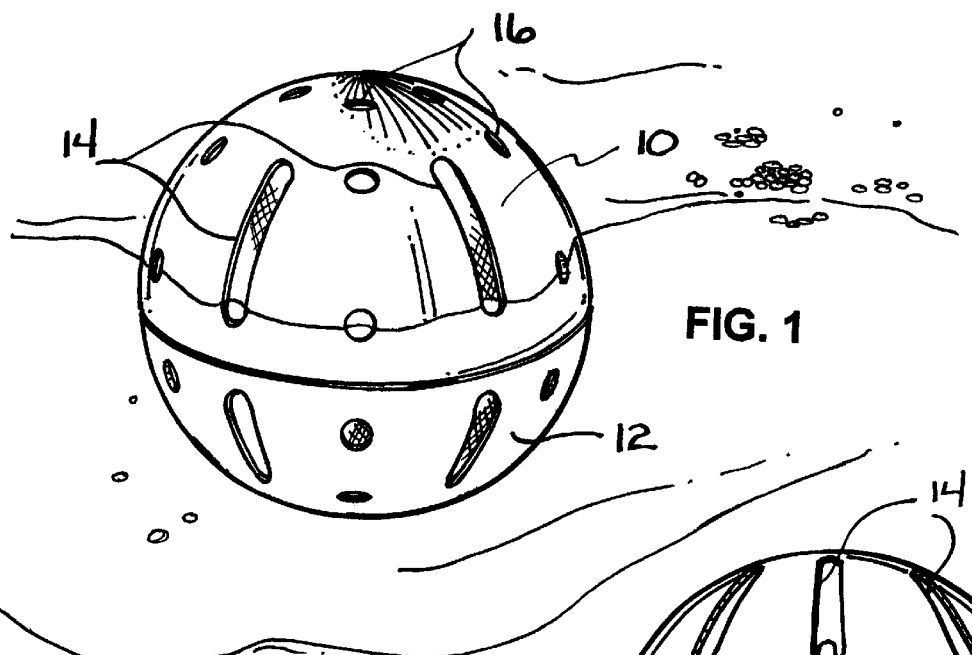
FIG. 1 is a perspective view of a preferred embodiment of the invention illustrated in its operating or working mode.

Reference now should be made to the drawings, in which the same reference numbers are used throughout the different figures to designate the same components. The dechlorinator unit which is illustrated in FIG. 1 comprises a main body portion consisting of two hemispherical matching halves 10 and 12. These matching hemispherical halves 10 and 12 are interconnected to form a hollow, spherical body member approximately 3" to 6" in diameter. A material which is suitable for the housing halves 10 and 12 is rigid PVC plastic or, alternatively, resilient plastic material. Other materials also may be used, if desired.

As shown in FIG. 1, the hemispherical parts 10 and 12 of the main body portion have a number of openings extending through the body portion to communicate with the interior. These openings are shown as slots 14 and holes 16. In FIG. 1, a mixture of slots 14 and holes 16 are shown. In the alternative embodiment of FIG. 2, only slots 14 are illustrated; whereas in the embodiment of FIG. 3, only holes 16 (with no slots) are shown. The drawings show both slots and holes to indicate that apertures of any desired configuration may be employed, so long as a sufficient number of these holes or slots are provided to permit a relatively high volume of water flow through the spherical body 10/12 when it is in its closed position as shown in FIG. 1.

The interior of the sphere 10/12 is filled with a dechlorinating filter material 36, preferably made in the form of elongated spun filaments of a copper-zinc alloy or a brass-zinc alloy (included in the definition of copper-zinc alloys). A form of such alloys currently is marketed as KDF® material. The manner of manufacturing the filter material 36 (shown in FIG. 5) is a standard manufacturing technique used to provide elongated spun filaments, such as steel wool and the like.

The filter material 36 is enclosed in a gauze-like fabric ball or cover 30, which has a high permeability or high poracity to water. The cover 30 is used to prevent any broken ends of the filaments of the filter material 36 from protruding through any of the holes 16 or slots 14 formed in the spherical body 10/12.

When a fully assembled dechlorinator filter unit, including the filter material 26 and cover 30 in it, is assembled as shown in FIG. 1 it may be moved back-and-forth in the water to cause water in the tub or other container to pass through the slots 14 or holes 16 in the outer housing member, and through the filter material 36. After swishing the filter unit 10/12 back-and-forth in the water a number of times (dependent upon the amount of water in the tub or other container), the chlorine present in the water is effectively removed, essentially in the same manner as in-line chlorine filters remove chlorine from the water passing through them in a shower unit. Once the dechlorination has taken place, the filter 10/12 is removed; and bathing in a conventional manner may be undertaken by the user. Since the water has been dechlorinated, the adverse effects of chlorine in the bath water are not present.

In time, depending upon the frequency and volume of use, the filter material 36 will become depleted. This results from the action of the filter, since the free chlorine is converted to water soluble zinc chloride which is harmless. It is also believed that the zinc has the benefit of being a nutrient for the skin. The filter material itself is non-toxic and bacteriostatic. In addition, algae and fungi are killed by contact with the copper-zinc filter material.

Figure 2:
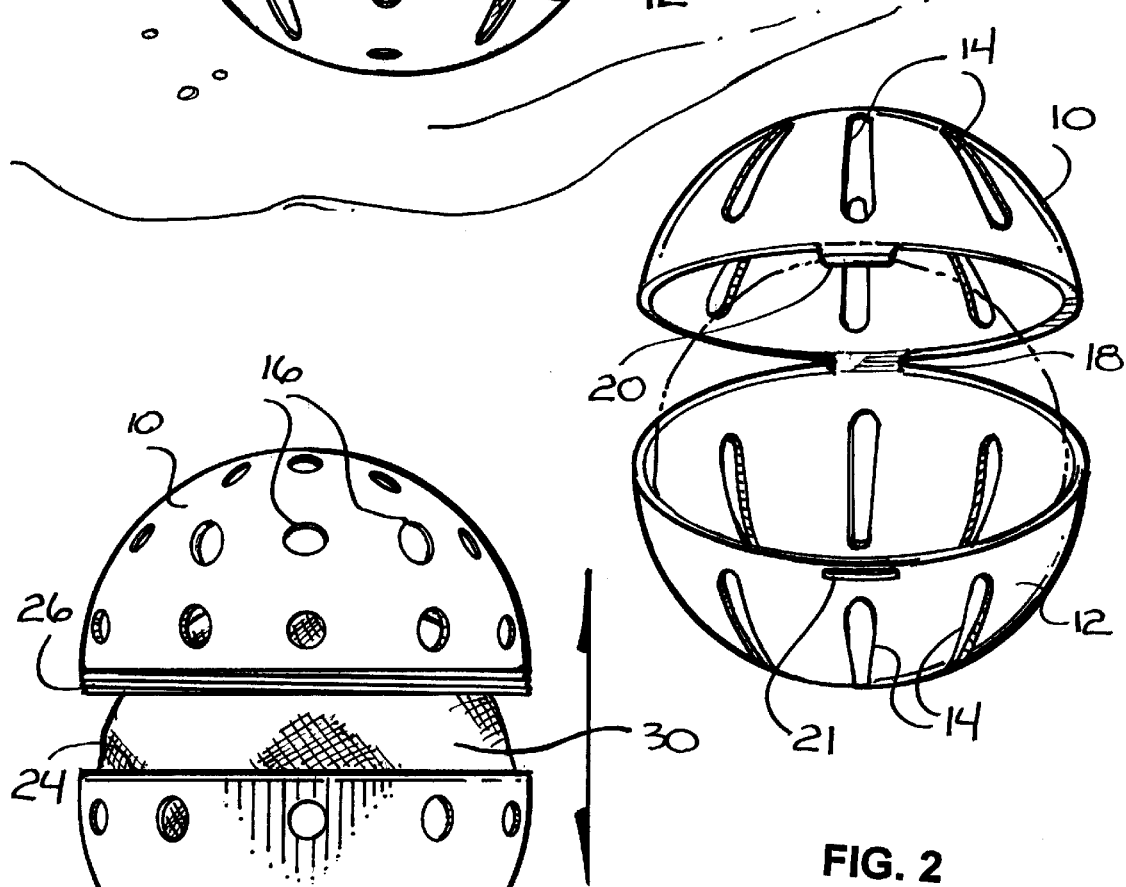
FIG. 2 is a perspective view of the embodiment of FIG. 1 illustrating a feature of its operation.
Figure 3:
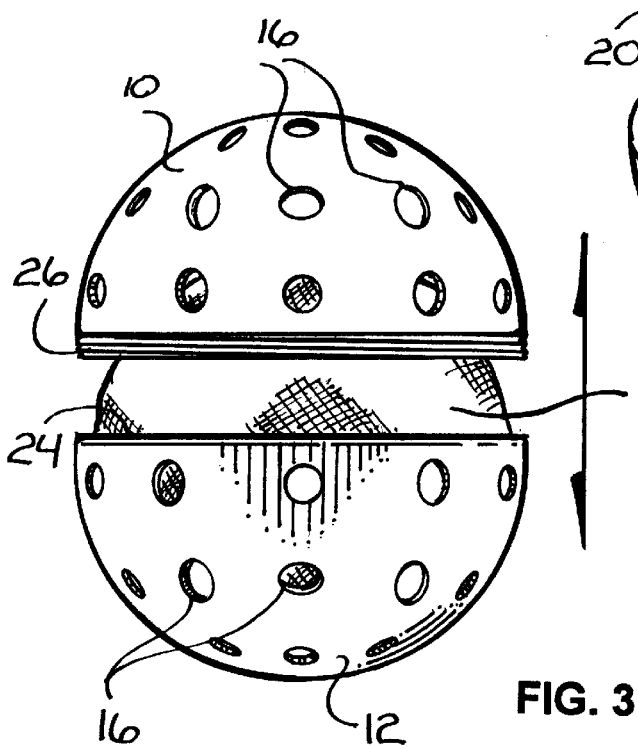
FIG. 3 is a side view of another embodiment of the invention illustrating an alternative feature.

To permit continued use of the filter, the spherical outer body member 10/12 is formed from two hemispherical parts. These parts are made to be releasably interconnected together to permit removal of a spent filter unit 30/36 and replacement of the spent unit with a new filter unit 30/36. FIGS. 2, 3 and 4 illustrate different structures which may be used to releasably interconnect the two halves 10 and 12 to form the spherical outer container or body member.

In FIG. 2, the two parts are molded together with a living hinge 18 interconnecting them at one point. In the filter unit shown in FIG. 2, the parts 10 and 12 are shown open or partially disassembled, where interior access may be obtained for removal and replacement of the active filter element 30/36. Once that has been done, the parts 10 and 12 of the device shown in FIG. 2 are squeezed together; and mating male and female fastener elements 20 and 21, located opposite the hinge 18, snap together to hold the parts 10 and 12 in the position shown in FIG. 1 during use of the filter.

In the device of FIG. 3, the two hemispherical parts 10 and 12 are illustrated as having an internally threaded portion 24 around the edge of the hemisphere 12; whereas the hemisphere 10 is externally threaded at 26. These mating threads then are secured together in well known fashion to close the filter once a new filter element package 30/36 has been placed in the filter, following removal of a spent filter element.

The device shown in FIG. 4 utilizes all of the same general principles shown in FIGS. 1, 2 and 3; but the hemispherical halves 10 and 12 employ matching male and female snap fittings 40 and 41 located about their edges. A slight amount of force is required to close the two halves together in the direction of the arrows shown in FIG. 4; and similarly, a slight force is required to pull the two parts apart, as shown in FIG. 4, in order to permit access to the filter interior.

While three different techniques for interconnecting the filter halves 10 and 12 are shown in FIGS. 2, 3 and 4, other techniques, such as a bayonet fastening of the two parts, may be employed as desired. The particular manner in which the two filter halves are interconnected is not important. If a replaceable interior cartridge is not desired, the filter halves 10 and 12 may be fused together by means of ultrasonic welding, adhesives, or the like. If this technique is employed, however, the entire unit needs to be thrown away once the filter material 30/36 has been depleted in making the chlorine exchange described above.

The foregoing description of the preferred embodiment of the invention should be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A portable dechlorinator for a confined body of water, including in combination:

a hollow body member comprising first and second parts releasably connected together, with each of the first and second parts having an outer surface and an inner surface with a plurality of openings therethrough, the first and second parts being releasably connected together to permit access to the interior of the hollow body member;

chlorine removal filter material in the form of randomly oriented elongated spun filaments of a copper-zinc alloy located in the hollow body member; and a water-permeable cover inside the hollow body member between the filter material and the inner surface of the hollow body member, wherein the water-permeable cover is fabricated of gauze material designed to permit substantial flow of water therethrough while preventing the spun filaments of filter material from passing therethrough into the openings through the hollow body member when the hollow body member is moved back-and-forth in a confined body of water.

2. The combination according to claim 1 wherein the hollow body member is made of plastic.

3. The combination according to claim 2 wherein the water permeable cover comprises a removable bag and the chlorine removal filter material is contained in the bag as a sub-assembly placed within the hollow body member.

4. The combination according to claim 1 wherein the hollow body member is of a generally spherical shape with a diameter in the range of three to six inches.

5. The combination according to claim 4 wherein each of the first and second parts of the hollow body member comprise a hemisphere and the two parts are releasably connected together to form a completed sphere.

6. The combination according to claim 5 wherein the first and second parts of the hollow body member are interconnected by a hinge at one point and include mating releasable catch members opposite the hinge to releasably hold the two parts together to form the hollow body member.

7. The combination according to claim 1 wherein the hollow body member comprises first and second interlocking parts to permit removal and replacement of the chlorine removal filter material.

8. The combination according to claim 7 wherein the first and second parts of the hollow body member are interconnected by a hinge at one point and include mating releasable catch members opposite the hinge to releasably hold the two parts together to form the hollow body member.

9. The combination according to claim 8 wherein the hollow body member is of a generally spherical shape.

10. The combination according to claim 1 wherein the water permeable cover comprises a removable bag and the chlorine removal filter material is contained in the bag as a sub-assembly placed within the hollow body member.

11. The combination according to claim 1 wherein each of the first and second parts of the hollow body member comprise a hemisphere and the two parts are releasably connected together to form a completed sphere.

* * * * *